United States Patent

Song

(10) Patent No.: US 7,376,285 B2
(45) Date of Patent: May 20, 2008

(54) METHOD OF AUTO-DESKEWING A TILTED IMAGE

(75) Inventor: Guang Bo Song, Beijing (CN)

(73) Assignee: Primax Electronics Ltd., Taipei (TW)

( * ) Notice: Subject to any disclaimer, the term of this patent is extended or adjusted under 35 U.S.C. 154(b) by 554 days.

(21) Appl. No.: 11/010,466

(22) Filed: Dec. 13, 2004

(65) Prior Publication Data

US 2006/0126965 A1 Jun. 15, 2006

(51) Int. Cl.
*G06K 9/36* (2006.01)
*G06K 9/32* (2006.01)
*G06K 9/40* (2006.01)

(52) U.S. Cl. ...................................... 382/289; 382/296

(58) Field of Classification Search ................ 382/289, 382/295, 296, 254, 266, 290, 293
See application file for complete search history.

(56) References Cited

U.S. PATENT DOCUMENTS

| 6,082,619 | A  | * | 7/2000 | Ma et al. | ................ | 235/462.1 |
| 6,687,421 | B1 | * | 2/2004 | Navon | ........................ | 382/289 |
| 7,031,553 | B2 | * | 4/2006 | Myers et al. | ............... | 382/289 |

* cited by examiner

*Primary Examiner*—Yon J. Couso
(74) *Attorney, Agent, or Firm*—Apex Juris, pllc; Tracy M Heims

(57) ABSTRACT

A method of auto-deskewing a titled original image is provided. Frist, obtain an original image by scanning to acquire values of pixels in the original image. Next subject the original image to a binarization process. And, set a datum line in the original image. Then determine a tilting angle on the basis of the datum line. Finally, adjust the original image on the basis of the tilting angle. Therefore, the tilting angle of the original image may be acquired to adjust.

9 Claims, 4 Drawing Sheets

METHOD OF AUTO-DESKEWING A TILTED IMAGE

BACKGROUND OF THE INVENTION

1. Field of Invention

The invention relates to a method of processing a digital image and particularly to a method of auto-deskewing a tilted image.

2. Related Art

In scanning an original document with a scanner, the original document is apt to be put in a tilted state, which is generally inconvenient for reading and has to process the scanned original document (inputted image). Therefore, inspection and correction of the tilted state of the inputted image are indispensible. In performing the operation of correction, a tilting angle of the inputted image has to be first inspected and then adjusted on the basis of the tilting angle so that the inputted image may be adjusted to a correct position.

Tilted image correction technology is a method of deskewing a tilted state of an image by inspecting the tilting angle of the tilt image and adjusting the tilting angle to a right angle through grid lines externally applied and textual direction in the image. This correction method may be used independently or used as a pre-process for an optical character recognition (OCR) process.

The image tilt correction method may be classified into a manual correction method and an automatic correction method. The manual correction is generally conducted through observation of the image by a user's eyes. In performing the automatic correction, the image is first analyzed, a tilting angle of the image is obtained, and then the image is automatically corrected from its tilted state. However, some traditional cut-away software used for this tilt correction purpose has the disadvantage of causing the corrected image to have saw-toothed edges.

The prior automatic tilted image correction methods comprise the projection profile method, the Hough transformation method, the cross correlation method, neighboring features clustering method, and so on.

The projection profile method is performed based on a structure energy function and provided a better correction result with respect to the textual areas in the image, but a poorer correction result with respect to the pictorial areas in the image.

The Hough transformation method is performed based on edge inspection and geometrical shape recognition with respect to the image, in which foreground pixels in the image are mapped in a space of the polar coordinates and values of the pixels in the space of the polar coordinates are accumulated so that the titling angle of the image is obtained. Similarly, this method may achieve a better effect only with the textual areas of the image.

The cross correlation method is conducted based on a concept of cross computation and corresponds to an algorithm of higher accuracy. This method provides solutions to the problems of varied main textual direction and blending of pictures and figures in the image. However, the algorithm adopted in this method has less precision.

The neighboring features clustering method is executed based on statistics, in which the problem of interference resulting from the pictorial area and the figure area in the image may be overcome and thus a better result may be obtained. However, since a relatively large textual area in the image is required for performing statistical analysis, an image having insufficient textual area may not have a good result since the insufficient features in the image may not provide sufficient statistical information.

The above-mentioned methods are the basic tilted image correction methods used in the field. Other methods are also available that are combinations of the concepts used in the above methods. From the above descriptions, it may be understood that the above methods have better effects with text images but relatively poor effects with images having larger pictorial and figure areas and smaller textual areas. Therefore, almost all prior tilted image correction methods are performed by relying on the textual areas but not the figure and pictorial areas, which have useful information for tilted image correction. Besides, most of the prior tilt correction methods are performed by making use of detailed contents and relations among the contents of the image but without making most use of a whole structure of the image, in which there is also information useful in determining the tilting angle of the image.

Therefore, there is a need to provide a method of auto-deskewing a tilted image which comprises textual, figure and pictorial areas.

SUMMARY OF THE INVENTION

In view of the drawbacks of the prior art, an object of the invention is to provide a method of auto-deskewing a tilted image that automatically obtains a tilting angle of the image and adjusts the tilted image on the basis of the tilting angle.

To achieve the above object, the method of auto-deskewing a tilted image according to the invention is provided. Frist, obtain an original image by scanning to acquire values of pixels in the original image. Next subject the original image to a binarization process. And, set a datum line in the original image. Then determine a tilting angle on the basis of the datum line. Finally, adjust the original image on the basis of the tilting angle. Therefore, the tilting angle of the original image may be acquired to adjust.

The method of auto-deskewing a tilted image according to the invention may first obtain the tilting angle of the tilted image through the set datum line and by making use of a whole structure of the tilted image, and then rotating the tilted image to a correct position. Experiments indicate that the method according to the invention provides higher accuracy, better scanning quality and higher speed than those of the prior art.

Further description and principles of the invention will be provided through the preferred embodiments as follows with reference to the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

In many cases, an original image put in a scanner comprises textual, figure and pictorial areas. The texts in the textual area may be longitudinally or laterally arranged and the numerous kinds of fonts are used. In addition, noise unavoidably occurs in the scanned original image. For the tilted image, an object of the invention is to provide an image output without any tilt.

Figure 1:
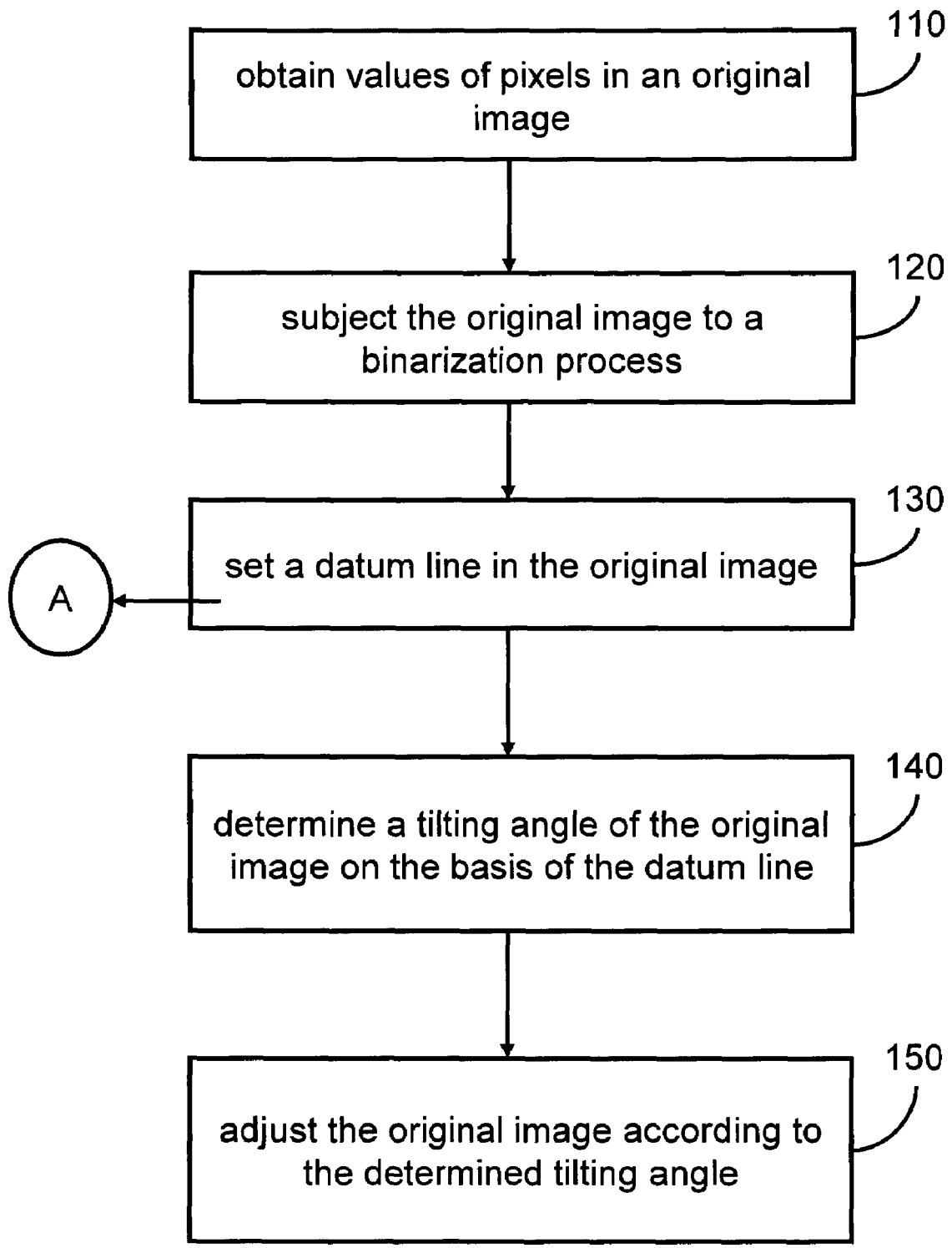
FIG. 1 is a flowchart summarizing a method of auto-deskewing a tilted image according to the invention.

Refer to FIG. 1, a flowchart summarizing a method of auto-deskewing a tilted image is illustrated therein.

As shown, the original image is first scanned and values of pixels in the original image are thus obtained (110). Then, the scanned original image is subject to a binarization process (120). Next, a datum line is set in the scanned original image (130). Thereafter, a tilting angle is determined on the basis of the datum line (140). Finally, the scanned original image is adjusted on the basis of the determined tilting angle (150).

Figure 2:
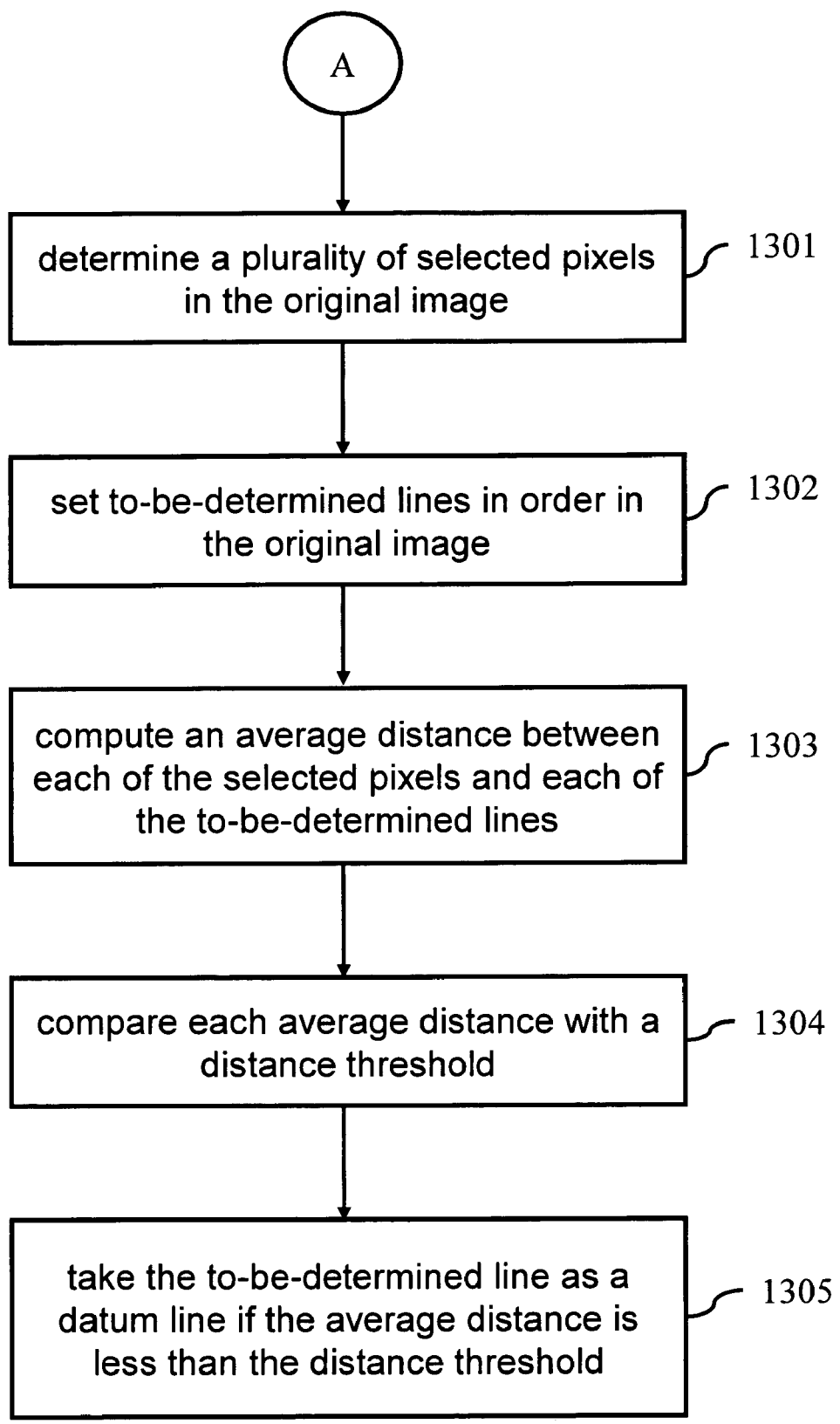
FIG. 2 is a flowchart illustrating a step of setting a datum line in the method of auto-deskewing a tilted image according to the invention.

In the method, a flowchart of the step of setting the datum line is illustrated in FIG. 2.

At first, determine a plurality of selected pixels in the scanned original image (1301). Then, set a plurality of to-be-determined lines in the scanned original image (1302). Next, compute a plurality of average distances between the selected pixel and the to-be-determined line (1303). Next, compare the average distance with a distance threshold (1304), wherein the threshold is one-third of the length of the to-be-determined line. If the average distance is less than the distance threshold, take the to-be-determined line as the datum line (1305).

Figure 3:
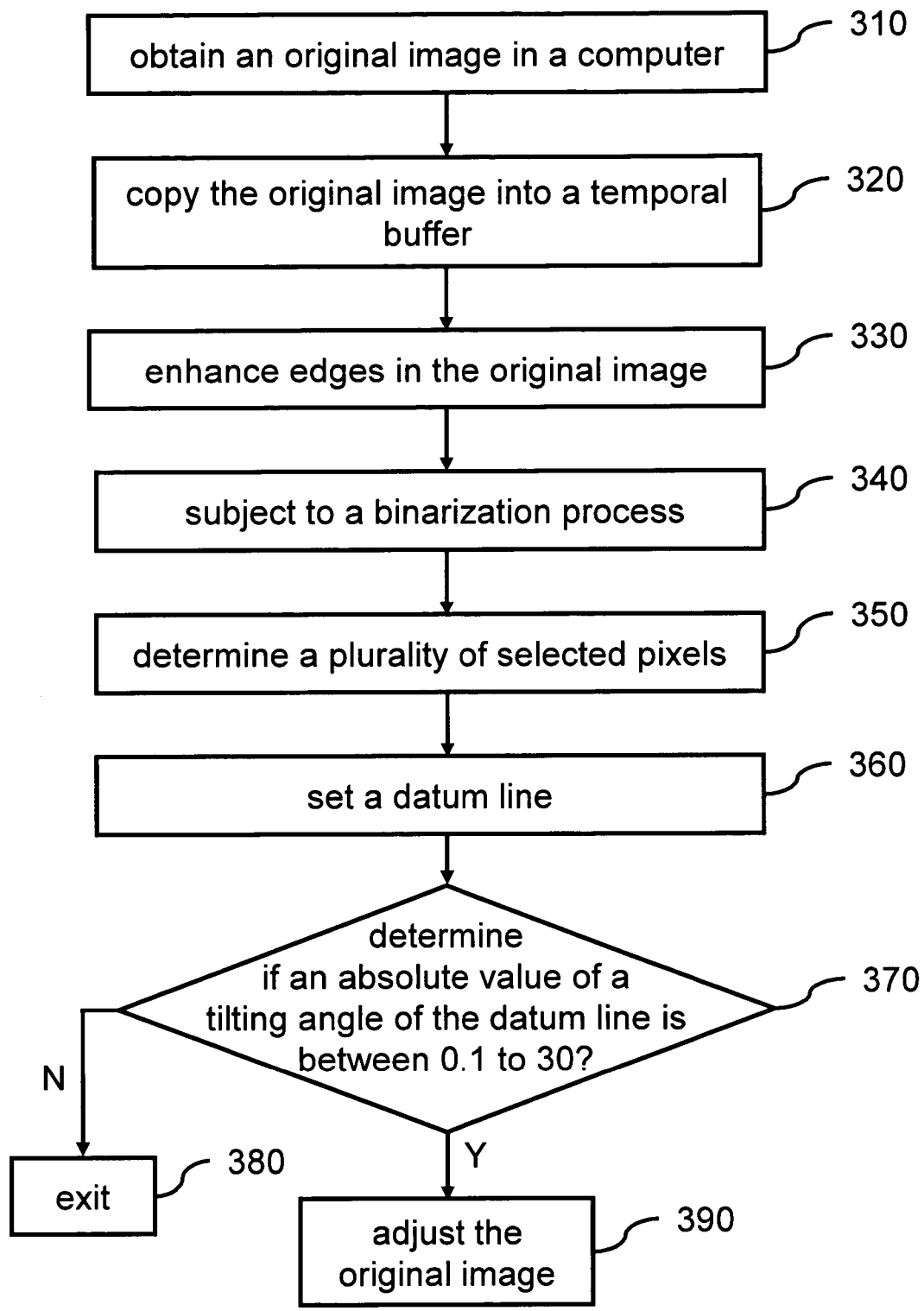
FIG. 3 is a flowchart of an embodiment of the method of auto-deskewing a tilted image according to the invention.

FIG. 3 illustrates an embodiment of the method of auto-deskewing a tilted image as mentioned in FIG. 2.

As shown, an original image is first obtained in a computer through an optical apparatus (310), for example, a scanner, a facsimile machine, a camara or the like. Then, the obtained original image is copied into a temporal buffer and subject to a pre-process in which noise in the obtained original image is eliminated (320). Next, the pre-processed image is subject to an edge enhancement process, in which edges in the image are enhanced (330). Next, the grey and colorful parts of the image are both subject to a binarization process (340). Next, determine a plurality of selected pixels in the image (350), wherein the selected pixels is a set of pixel points having number of the pixels greater than number of the thresholds.

Figure 4:
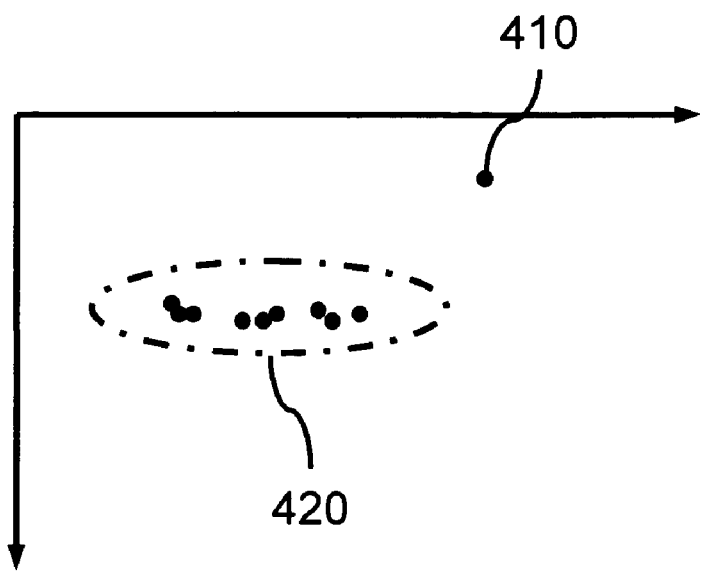
FIG. 4 is a schematic illustration of an embodiment of the selected pixels according to the invention.

An embodiment of the selected pixels according to the invention is illustrated in FIG. 4. In this embodiment, the number of the thresholds is three so a set of pixel points having over three pixels and not isolated from one another is defined as the selected pixels. As shown, the pixel point 410 is defined as an isolated pixel and the set of pixel points 420 are defined as the selected pixels.

Thereafter, noise points in the selected pixels are to be eleminated and are referred to those points having no contribution in setting the datum line. Specifically, a noise pixel is a pixel point having a distance to the to-be-determined line is greater than a determined multiple of the average distance.

Figure 5:
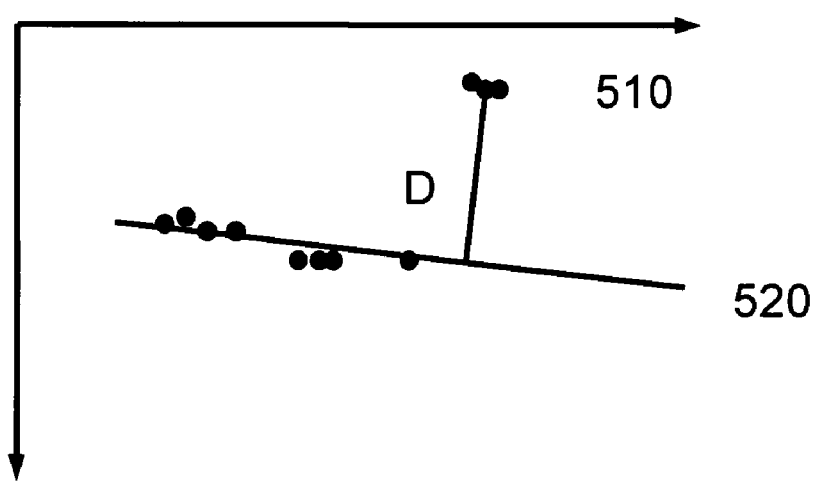
FIG. 5 is a schematic illustration of noise pixels in the selected pixels according to the invention.

FIG. 5 illustrates schematically noise pixels in the selected pixels according to the invention. In this figure, a set of pixel points 510 are noise points in the selected pixels since the distance D between the set of pixel points 510 and to-be-determined line 520 is greater than an average distance between the selected pixels and the to-be-determined line 520, and the difference of the distance D and the average distance is a predetermined value which is a product of the average distance and a predetermined parameter.

Reference to FIG. 3, with the procedures in FIG. 2, to-be-determined lines are set continuously on the basis of a determined distance from one terminal to another terminal of the original image, such as from top to bottom, and a datum line is set to fill the bill (360). Next, determine if an absolute value of a tilting angle of the datum line is between 0.1 to 30 (370). If not, the original image is determined as having no tilting angle and does not need to be rotated (380). Otherwise, the original image is determined to have a tilting angle and the original image is adjusted (390).

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of auto-deskewing an original image, comprising the steps of:
   obtaining an original image by scanning to acquire values of pixels in the original image;
   subjecting the original image to a binarization process;
   setting a datum line in the original image wherein the step of setting the datum line in the original image comprises the steps of determining a plurality of selected pixels in the original image;
      setting sequentially a plurality of to-be-determined lines in the original image; computing a plurality of average distances between each of the selected pixels and each of the to-be-determined lines;
      comparing the average distances with a distance threshold; and taking the to-be-determined line as the datum line if the average distance is less than the distance threshold;
   determining a tilting angle of the original image on the basis of the datum line; and
   adjusting the original image according to the determined tilting angle.

2. The method as claimed in claim 1, further comprising a step of pre-processing the original image to eliminate noises in the original image after the step of obtaining the original image by scanning to acquire values of pixels in the original image.

3. The method as claimed in claim 1, further comprising a step of enhancing edge of the original image after the step of obtaining the original image by scanning to acquire values of pixels in the original image.

4. The method as claimed in claim 1, wherein the distance threshold is one-third of the to-be-determined line.

5. The method as claimed in claim 1, wherein the selected pixels are a set of pixel points having the number of the pixels being greater than the number of the thresholds and not isolated with one another.

6. The method as claimed in claim 5, wherein the number of the thresholds is three.

7. The method as claimed in claim 1, wherein the step of setting sequentially a plurality of to-be-determined lines in the original image is setting sequentially to to-be-determined lines on the basis of a determined distance from one terminal of the original image to another terminal of the original image.

8. The method as claimed in claim 1, further comprising a step of removing noise pixels in the selected pixels.

9. The method as claimed in claim 8, wherein the noise pixels are pixel points each having a distance to the to-be-determined line that are greater than a determined multiple of the average distance.

* * * * *